United States Patent
Pendharkar et al.

(10) Patent No.: US 10,255,217 B2
(45) Date of Patent: Apr. 9, 2019

(54) TWO LEVEL QOS SCHEDULING FOR LATENCY AND QUEUE DEPTH CONTROL

(71) Applicant: Veritas Technologies LLC, Mountain View, CA (US)

(72) Inventors: Niranjan Pendharkar, Pune (IN); Prasanna Wakhare, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 442 days.

(21) Appl. No.: 14/945,309

(22) Filed: Nov. 18, 2015

(65) Prior Publication Data

US 2016/0291885 A1 Oct. 6, 2016

(51) Int. Cl.
| | |
|---|---|
| *G06F 3/06* | (2006.01) |
| *G06F 13/40* | (2006.01) |
| *G06F 9/455* | (2018.01) |
| *G06F 11/14* | (2006.01) |
| *G06F 12/0804* | (2016.01) |
| *G06F 12/0815* | (2016.01) |

(52) U.S. Cl.
CPC .......... *G06F 13/4027* (2013.01); *G06F 3/068* (2013.01); *G06F 3/0613* (2013.01); *G06F 3/0619* (2013.01); *G06F 3/0631* (2013.01); *G06F 3/0635* (2013.01); *G06F 3/0659* (2013.01); *G06F 3/0683* (2013.01); *G06F 9/45558* (2013.01); *G06F 11/1451* (2013.01); *G06F 12/0804* (2013.01); *G06F 12/0815* (2013.01); *G06F 2009/45579* (2013.01); *G06F 2201/84* (2013.01); *G06F 2212/1032* (2013.01); *G06F 2212/152* (2013.01); *G06F 2212/281* (2013.01)

(58) Field of Classification Search
CPC .... G06F 3/0613; G06F 3/0619; G06F 3/0631; G06F 3/0659; G06F 3/068; G06F 13/4027; G06F 9/1451; G06F 12/0804; G06F 12/0815

See application file for complete search history.

(56) References Cited

U.S. PATENT DOCUMENTS

| | | | |
|---|---|---|---|
| 8,700,875 B1 * | 4/2014 | Barron .................. | G06F 3/0605 711/170 |
| 2006/0164989 A1 * | 7/2006 | Hart ..................... | H04L 43/0894 370/235 |

(Continued)

*Primary Examiner* — Nanci N Wong
(74) *Attorney, Agent, or Firm* — Patent Law Works LLP

(57) ABSTRACT

A method for two level quality of service scheduling for latency and queue depth control in a storage system is provided. The method includes determining queue depth as input/output operations per unit time that a storage subsystem can sustain, for each of a plurality of queues corresponding to storage subsystems in the storage system and determining system capacity as total input and output operations per unit time that the storage system can sustain, based on the queue depth of each of the plurality of queues. The method includes determining whether to accept or deny an input/output request for placement onto an input/output stack, based on a comparison of credits of the input/output request to the system capacity as determined on an ongoing basis, and placing the input/output request from the input/output stack onto one of the plurality of queues based on whether doing so maintains the queue depth of the one of the plurality of queues.

14 Claims, 4 Drawing Sheets

(56) References Cited

U.S. PATENT DOCUMENTS

| | | | |
|---|---|---|---|
| 2008/0222311 A1* | 9/2008 | Lee .................... | G06F 3/061 710/6 |
| 2011/0119679 A1* | 5/2011 | Muppirala ............ | G06F 3/0611 718/105 |
| 2015/0058527 A1* | 2/2015 | Venkata .............. | G06F 12/0873 711/103 |
| 2016/0292036 A1* | 10/2016 | Benhase ............. | G06F 11/2066 |

* cited by examiner

TWO LEVEL QOS SCHEDULING FOR LATENCY AND QUEUE DEPTH CONTROL

BACKGROUND

Quality of Service (QoS) is both a measurement of system performance and an expectation that users or clients of a system have. Throughput, latency, error rates, availability and other parameters can be measured to determine system performance, and various systems and mechanisms have been devised to guarantee it. Many network, storage and computing systems implement Quality of Service with a queuing system. If an input/output (I/O) request is within a well-defined credit limit, then the I/O request is allowed to enter into the system, and otherwise the I/O request is queued until it has sufficient credits. These credits are replenished every second (or other time interval), so there is not any starvation. In virtualized storage systems, once entered into the system, the I/O request can go through the entire storage stack and then through the storage stack of an underlying hypervisor operating system and finally to a device queue. However, if the system allows the I/O request just on credits, or other such similar algorithm, it is very likely that many I/O requests can land at the same time at the device layer. Then, even after all of the efforts which a Quality of Service queuing system takes to control throughput and latency, the I/O requests can still congest a device. This can result in unpredictable latency. Also, this has a cascading effect because once latencies are high, the Quality of Service queuing system then drastically throttles back the I/O requests allowed through, and on the next clock tick the system observes low latency and increases the capacity of the system again. This can result in an oscillation of latency and throughput, which is undesirable and fails to meet latency guarantees consistently in a Quality of Service system. There are also difficulties in supporting different deadline classes with different urgencies of I/Os. Therefore, there is a need in the art for a solution which overcomes the drawbacks described above and satisfies both latency as well as throughput sensitive applications regardless of priority.

SUMMARY

In some embodiments, a processor-based method for two level quality of service scheduling for latency and queue depth control in a storage system. The method includes determining queue depth as input/output operations per unit time that a storage subsystem can sustain, for each of a plurality of queues corresponding to storage subsystems in the storage system and determining system capacity as total input and output operations per unit time that the storage system can sustain, based on the queue depth of each of the plurality of queues. The method includes determining whether to accept or deny an input/output request for placement onto an input/output stack, based on a comparison of credits of the input/output request to the system capacity as determined on an ongoing basis, and placing the input/output request from the input/output stack onto one of the plurality of queues based on whether doing so maintains or exceeds the queue depth of the one of the plurality of queues.

In some embodiments, a tangible, non-transitory, computer-readable media having instructions thereupon which, when executed by a processor, cause the processor to perform a method is provided. The method includes determining, for each storage subsystem of a plurality of storage subsystems of a storage system how many input/output operations per unit time the storage subsystem can sustain, as a queue depth of the storage subsystem, wherein the queue depth is associated with a queue coupled to the storage subsystem, there being a plurality of such queues corresponding to the plurality of storage subsystems. The method includes determining based on the queue depths of the plurality of storage subsystems, total input/output operations per unit time that the storage system can sustain, as system capacity of the storage system. The method includes accepting or refusing to place input/output requests onto an input/output stack based on credits of each of the input/output requests in comparison to system capacity determined on an ongoing basis, and moving the input/output requests from the input/output stack to the plurality of queues corresponding to the plurality of storage subsystems so as to maintain the queue depth of each such queue.

In some embodiments, a storage system scheduler is provided. The system includes an input/output stack, a plurality of queues, each configured to couple to one of a plurality of storage subsystems of a storage system and one or more processors, configured to implement a first scheduler and a second scheduler. The second scheduler is configured to determine, on a continuous or interval basis, queue depth for each queue of the plurality of queues, wherein the queue depth is input/output operations per unit time the one of the plurality of storage subsystems to which the queue is coupled can sustain. The first scheduler is configured to determine, on the continuous or interval basis, system capacity of the storage system, wherein the system capacity is the total input/output operations per unit time that the storage system can sustain, based on the queue depth of each of the plurality of queues. The first scheduler is configured to compare credits of input/output requests to the system capacity as determined on the continuous or interval basis and accept or reject input/output requests onto the input/output stack based on such comparison. The second scheduler is configured to move the input/output requests from the input/output stack onto the plurality of queues based on maintaining the queue depth of each of the plurality of queues.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
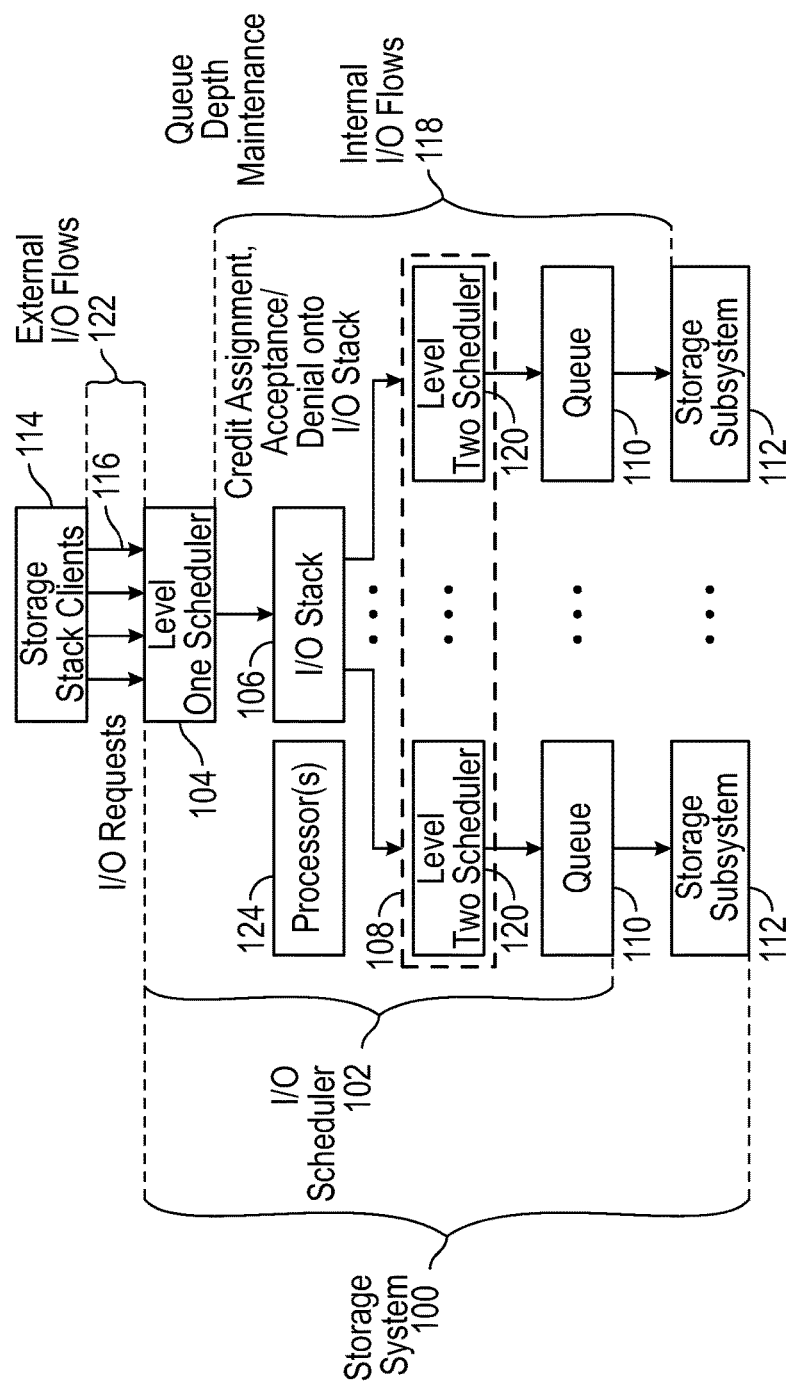
FIG. 1A is a system diagram of an I/O scheduler with two-level Quality of Service I/O scheduling for latency and queue depth control in a storage system, in accordance with an embodiment of the present disclosure.

A two level Quality of Service I/O (input/output) scheduler and scheduling method for latency and queue depth control are herein described. The scheduler and scheduling method consider system capacity, which mandates entry into the system based on the calculated capacity of the system. The scheduler and scheduling method also consider queue depth, which are the outstanding I/O requests at a storage resource at any given time. A level one scheduler allows an I/O request if the I/O request is within the credit limits assigned to an application. Being the highest level scheduler, the level one scheduler handles the I/O request right at the I/O entry level and will not allow the storage stack to congest beyond the capacity of the storage system. A level two scheduler is aware of storage characteristics of devices and storage tiers, and determines to which I/O subsystem, particularly which storage subsystem, an I/O request will proceed. The level two scheduler has one queue per queue depth per storage subsystem. Queue depth is defined herein as the number of concurrent I/O operations per second (or other unit of time) that an underlying device or memory tier in the storage system can sustain at any point in time.

Some embodiments have multiple queues per queue depth, for example in systems where there are multiple storage subsystems having similar queue depth, or systems with a storage subsystem that is subdivided so as to have multiple queues with the same queue depth. This supports latency sensitive applications with a minimized queue depth depending on the deadline class, and supports throughput sensitive applications by sending I/O requests to the highest queue depth queue.

The level two scheduler always makes sure that in-progress I/Os at an underlying storage subsystem should be less than or equal to the associated queue depth of that storage subsystem. Since the queue depth is a function of the storage as well as the deadline specified with the application, e.g., through the service level agreement (SLA), the system will queue the I/O to the specific queue depth queue. While servicing the I/Os from that particular queue, the associated queue depth will be strictly maintained. Thus, the level two scheduler can also control latencies as per a deadline mentioned in the service level agreement of the application. Because of all this, the two-level scheduling described herein achieves consistent and controlled throughput. Any number of combinations of tiered storage are handled by having two-level scheduling models. The two-level scheduler cooperatively works such that the top level scheduler (at level one) gives a storage agnostic view to its clients while the storage specific scheduler (at level two) abstracts and handles the complexity of the storage device(s). Quality of Service is thus controlled in every storage device, by the level two scheduler. Even if the system overshoots capacity, the level two scheduler is able to limit the number of concurrent I/Os for a particular storage device.

FIG. 1A is a system diagram of an I/O scheduler 102 with two-level Quality of Service I/O scheduling for latency and queue depth control in a storage system 100, in accordance with an embodiment of the present disclosure. The I/O scheduler 102 has a level one scheduler 104, an I/O stack 106, a level two scheduler 108, and multiple queues 110, which can also be called queue depth queues 110 as they have controlled queue depth. Each queue 110 is coupled to a storage subsystem 112, examples of which are shown in FIG. 2. These components can be implemented in software resident in memory and executing on one or more processors 124, hardware, firmware, or various combinations thereof. For example, the I/O stack 106 and each of the queues 110 can be implemented as hardware stacks and hardware queues, software stacks and software queues, or combinations thereof. The level one scheduler 104 and level two scheduler 108, which can include multiple level two scheduler modules 120, could be implemented as hardware state machines, or as software. Any of these could be compiled onto electronic circuitry. Operation of the I/O scheduler is described below, following the description of a variation of the I/O scheduler 102 (in FIG. 1B) and the example storage subsystems 112 (in FIG. 2).

Figure 1B:
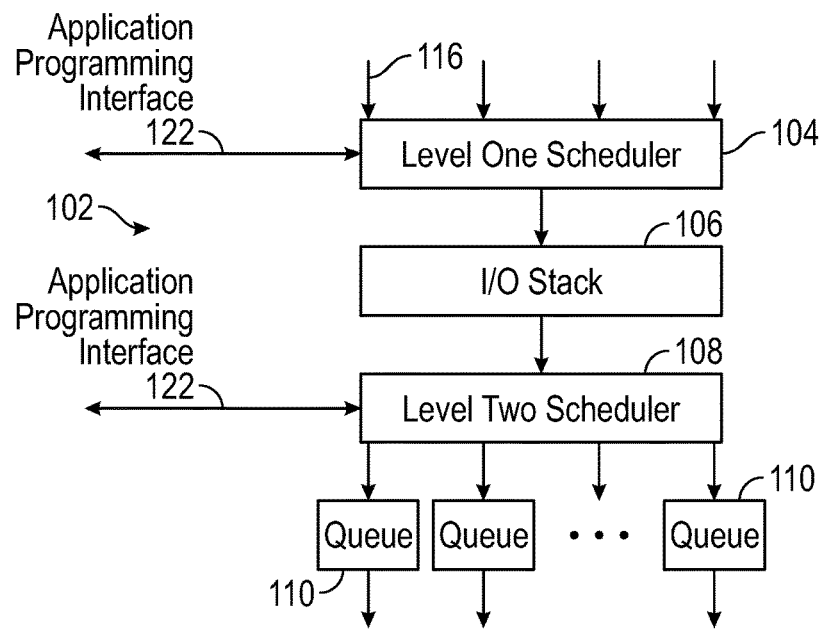
FIG. 1B is a system diagram of a variation of the I/O scheduler of FIG. 1A.
Figure 2:
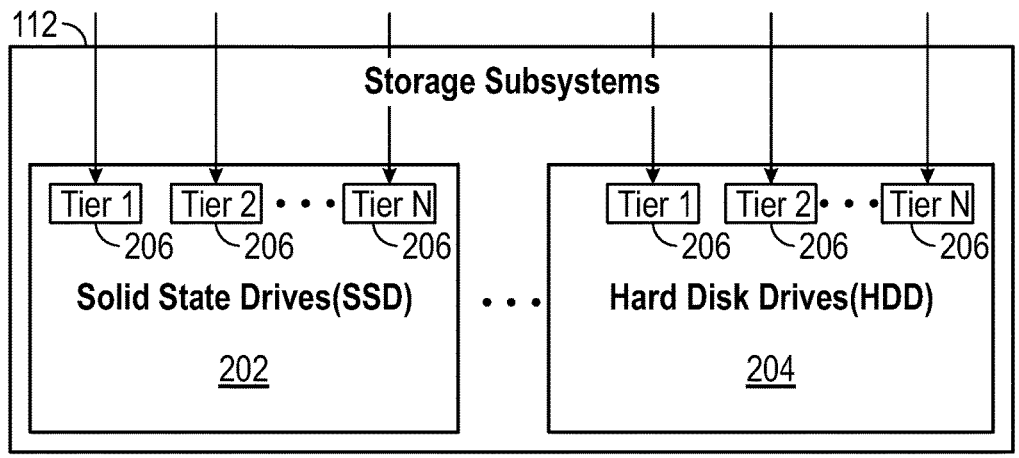
FIG. 2 illustrates multi-tiered storage subsystems in an example of storage for the storage system 100.

FIG. 1B is a system diagram of a variation of the I/O scheduler 102 of FIG. 1A. Here, the level two scheduler 108 is depicted as a single unit with multiple queues 110, as a variation of the level two scheduler 108 having multiple level two scheduler modules 120 as shown in FIG. 1A. The level one scheduler 104 has an application programming interface (API) 122, as does the level two scheduler 108. This could be applied to the embodiment shown in FIG. 1A, as well. These application programming interfaces 122, or variations thereof, could be used for storage discovery, in which a storage driver for a storage subsystem 112 communicates storage characteristics of devices that the driver discovers, internal I/O management, in which drivers responsible for internal I/O operations communicate from various layers such as system library or transport layer (e.g., NFS/CIFS), and/or level two communications, in which the device driver managing a particular storage device or subsystem communicates to the level two scheduler 108.

FIG. 2 illustrates multi-tiered storage subsystems 112 in an example of storage for the storage system 100. This is but an example, and there are many more storage subsystems 112 and organizations of memory for storage that would function with the I/O scheduler 102 in a storage system 100. Solid-state drives (SSD) 202 could have all the same or different types of solid-state memory, and be divided into multiple tiers 206 such as tier 1, tier 2 through tier N. Hard disk drives (HDD) 204 could have all the same or different models or types of drives, and be divided into multiple tiers 206 such as tier 1, tier 2 through N. Individual components could each constitute a single tier 206 in some systems. Components can be grouped together to form a single tier 206, or a single component or group of components can be divided into multiple tiers 206. Virtualized storage can have underlying physical components, which can be grouped in various ways as storage subsystems 112. Other types of memory such as optical storage or magnetic tape could be used. It is envisioned that the system would work with types of memory in development or yet to be developed, and should not be seen as limited to any particular type of memory or storage product.

With reference to FIGS. 1A-2, operations of the I/O scheduler 102 and storage system 100 are now described. The level one scheduler 104 controls the number of I/Os (i.e., I/O requests 116) serviced. I/Os that exceed a credit limit set by the controller are queued (in the I/O stack 106) before being sent over to the level two scheduler 108. The level two scheduler regulates the queue depth of storage devices. I/Os admitted by the level one scheduler 104 may still be queued if the device is likely to operate beyond the configured to depth. The level two scheduler sorts I/Os according to deadline before submitting them to the storage device. This approach does not necessarily curtail the queue depth. Instead, the system treads a middle path where throughput is not compromised all the while deadline is met on a best effort basis.

Storage stack.clients 114 communicate I/O requests 116, as external I/O flows 122, to the level one scheduler 104. These could be communicated through an application programming interface 122 provided by the level one scheduler 104, as shown in FIG. 1B. For example, an I/O request 116 could be a request to read data from, or write data to the storage system 100.

The level two scheduler 108 communicates, for example via application programming interface 122 provided by the level two scheduler 108, with the various storage subsystems 112. On an ongoing basis, that is continually or at frequent intervals such as once per second, the level two scheduler determines the queue depth for each of the queues 110. Each queue 110 is associated with and coupled to a storage subsystem 112, a tier 206 of a storage subsystem 112, or an individual component of a storage subsystem 112, etc. The queue depth is the number of I/O operations per unit time (e.g., per second) that the particular storage subsystem, tier 206 or underlying component can sustain at that time. It should be appreciated that this definition of queue depth differs from the definition used in some systems elsewhere for queue depth of a fixed capacity or size of a queue, which may be limited by hardware or memory allocation. Examples of calculations for queue depth are given below, following the operational description. By contrast, in present embodiments the queue depth is a continually measured or monitored throughput capacity, per fine-grained storage resource, that is to be controlled and maintained for the queue 110 associated with the storage subsystem 112, rather than a fixed size of queue memory determined by design or implementation.

Making use of these determined queue depths, the level one scheduler 104 determines, on an ongoing basis, i.e., continually or at frequent intervals such as once per second, the system capacity of the storage system 100. This system capacity is the total number of I/O operations per unit time (e.g., per second) that the storage system 100, made up of all the storage subsystems 112, can sustain. Examples of calculations for system capacity are given below, following the operational description.

Equipped with this information, the level one scheduler considers each I/O request 116 and determines whether to allow the I/O request 116 and place the I/O request 116 on the I/O stack 106, or reject, deny or refuse the I/O request 116. This decision is based on comparing the credits the I/O request 116 has to the system capacity. In some embodiments, the level one scheduler 104 assigns credit to each incoming I/O request 116. Or, the credits could be assigned by another component of the storage system 100. Credits could be based on service level agreements applicable to a client system or application, priority applicable to a client system or application, a deadline or throughput requirement of an I/O request 116, aging of the I/O request 116, and/or other consideration(s). I/O requests 116 could inherit parameters applicable to credit assignment from an application or a client. In some embodiments, if the number of credits that an I/O request 116 has is greater than the determined system capacity, at that moment of consideration and decision, the level one scheduler 104 places the I/O request 116 onto the I/O stack 106. A storage stack client 114, e.g., an application executing elsewhere, that has an I/O request 116 refused is free to retry the I/O request 116. By determining whether and when to place input requests 116 onto the I/O stack 106, the level one scheduler 104 controls latency of I/O request servicing on an ongoing basis.

The level two scheduler 108 considers I/O requests 116 on the I/O stack 106. In some embodiments, the I/O stack 106 is a first-in first-out stack, and I/O requests are added to the top of the I/O stack 106 by the level one scheduler 104 and removed from the bottom of the I/O stack 106 by the level two scheduler 108. In further embodiments, the level two scheduler 120 can access I/O requests 116 anywhere on the I/O stack 106, and may consider them by weighting e.g., according to credits.

There are two aspects for the level two scheduler 108 to consider, for each I/O request 116 to be placed in a storage subsystem 112. The first aspect is into which queue 110 to place the I/O request 116, and the second aspect is whether placing the I/O request 116 in such a queue 110 will maintain the queue depth of the queue 110, or not. Determination of which queue 110 into which to move the I/O request 116 could be based on latency or throughput requirement of the I/O request 116. If placing the I/O request 116 onto the desired queue 110 so determined does not exceed the determined queue depth of that queue 110, at that moment, the level two scheduler 108 moves the I/O request 116 from the I/O stack 106 onto that queue 110. If this would exceed the determined queue depth of that queue 110, the level two scheduler 108 does not place the I/O request 116 onto that queue 110. In this manner, the level two scheduler 108 maintains the queue depth of each queue 110, by not placing or allowing more I/O requests 116 onto a queue 110 than that queue 110 and associated storage subsystem 112 can handle at that time. In other words, queue depth of a queue 110 and associated storage subsystem 112 is maintained by allowing a total number of I/O requests 116 on that queue 110 less than or equal to the determined queue depth of that queue 110. The level two scheduler 108 thus performs queue depth maintenance on an ongoing basis, by determining queue depth and placing I/O requests 116 accordingly, keeping throughput optimized and not subject to oscillation of throughput as other systems without queue depth maintenance might. The level two scheduler 108 may consider multiple queues 110 for a particular I/O request 116, and select one queue 110 whose queue depth would not be exceeded, for receiving the I/O request 116.

In some embodiments the I/O requests 116 which remain queued at the level two scheduler 108 at the end of the tick are resubmitted back to the level one scheduler 104 to reissue the credits. This way these two schedulers, the level one scheduler 104 and the level two scheduler 108, work in tandem and make sure that the storage subsystem should never be congested. This is particularly essential in hybrid storage environments, since such a subsystem may consist of slower storage as well as faster storage. So often in previous known systems, excessive credits are given to a workload which is meant for a slower storage, since the workload pattern is random. In such cases, the presently described two scheduler scheme will make sure not to congest the slower storage and at the same time not under-utilize the faster storage.

The following is an example of how calculations for system capacity are made, in some embodiments. The term IOPs refers to input/output operations per second, although other time intervals could be used in further embodiments.

Various embodiments allow a user to specify some or all of the following service level agreements per flow, or variations thereof:

Min-IOPs—Minimum IOPs guaranteed to workloads.
Max-IOPs—Maximum IOPs permitted to workloads.
Priority—Priority assigned to workload.
Deadline—Deadline in microseconds.

Burst IOPs—Permissible burst IOPs for applications. If not specified, OPF will automatically detect burst and assign appropriate burst IOPs value.

NOTE: There are no strict deadline guarantees; nevertheless, the system will try to ensure that D(w1)<=D(w2) iff deadline specified by workload w1< deadline specified by workload w2.

In some embodiments, the system monitors and records stats and feeds them to the decision making controller module, e.g., the I/O scheduler 102, which includes the level one scheduler 104 and level two scheduler 108. Following values are captured either periodically or per I/O depending on the usage:

Rate of I/O completion per VM (virtual machine) per storage subsystem (comp_iops(i, j)).
Arrival IOPs per VM (ariops(I))
Average waiting time in the queue per VM (lq (i))
Average service (response) time per IO per underlying storage device (ls (i))

The controller wakes up every second and recalculates the capacity and queue depth of all the underlying storage devices. It applies queuing theory to the parameters collected by stats monitor to calculate:

Window—Maximum number of outstanding requests on a particular storage subsystem:

$$w(t, j) = (1 - \gamma)w(t-1, j) + \gamma\left(\frac{lat_{congestion(j)}}{ls(t-1, j)} * w(t-1, j)\right)$$

Where
$lat_{congestion\ (j)}$: Congestion point latency of jth storage device beyond which storage device saturates. This latency is determined and recalculated by the controller based on observed latencies and throughput ls(t−1): service response time of j storage Storage capacity—The value of window is calculated such that the storage is kept sufficiently busy to obtain the desired throughput at expected latency. Using queuing theory the total capacity of the storage subsystem is determined. Storage subsystem capacity is in terms of IOPs. This also refers to the available credits for all workloads on that tick. Tick refers to the frequency of the controller at which it wakes up and refines its decisions. In one embodiment, the tick is one second:

$$C(t, j) = \frac{w(t, j)}{lat_{congestion(j)}}$$

Workload Demand—This is a guesstimate of IOPs demanded by a workload (VM or vdisk)

$$Demand[Ai] = \begin{cases} ariops(Ai) \text{ if } f\ tl[i] \leq D \\ \frac{ariops(Ai) * tl[i]}{D} \text{Otherwise} \end{cases}$$

$$tl[i] = lq[i] + ls[i]$$

Where,
D: Deadline of a workload as per SLA
ariops(Ai): Exponential moving average of arrival IOPs of Ai workload
tl[i]: Total latency which is summation of service latency and queuing latency of I/O Because the decision whether to permit or queue the I/O needs to be fast and quick, the number of parameters influencing this decision should be kept at a minimum. For one embodiment, these happen to be the credits that are given to workloads and which are distributed by a flow control algorithm based on storage capacity. Capacity aggregation is not straightforward for hybrid systems since I/Os are handled by any storage device at any instant. Thus, if overall capacity is based on a slower storage device or tier, the calculated credits come out to be far fewer than what is actually available for the storage system. This results in underutilization of the resources. On the contrary, capacity based on faster storage devices or tiers (e.g., RAM or SSD) will cause congestion for I/Os landing on slower devices.

One embodiment calculates the aggregate capacity according to the equation $$Ct = \sum_{i=1}^{mss} \left( ct(i) * \frac{tpiops(i)}{\sum_{n=1}^{mss} tpiops} \right)$$

Where,
tpiops(i): throughput in iops maintained as exponential moving average for storage subsystem i
mss: Maximum number of storage subsystems or devices
ct(i): Capacity of the ith storage subsystem In short, one embodiment calculates the capacity of each storage system separately but it does not aggregate it. Instead, the system only considers the factor of capacity which is being used by all workloads over a period of time. The capacity share of a storage device is calculated by multiplying its individual capacity to the ratio of IOPs usage of that storage to total IOPs across all the storage devices. Since the IOPs are evaluated as exponential moving average, they will absorb any variance arising out of transient workload characteristics.

As an example, suppose the SSD and HDD tiers are servicing 70 and 30 percent of I/Os respectively for a sample period. The total available capacity of the system will then be 0.7×Ct(SSD)+0.3×Ct(HDD).

There is still the possibility of more I/Os arriving on the HDD than the SSD while capacity is biased towards SSD. This would result in a certain capacity overshoot. Consider another example. Suppose 10000 I/Os are being pumped into the system and they are split between SSD (9900 I/Os) and HDD (100 I/Os). If the system has SSD capacity of 10000 and HDD capacity of 2000, the aggregate capacity comes out to be 0.99×10000+0.01×2000=9920.

So, if 1000 I/Os arrive on HDD at the next tick, they will all be let in by the level one scheduler 104 since the total is well below the calculated capacity of 9920. If the HDD queue depth is 2 and it takes 10 milliseconds for HDD to complete the I/O, then the level two scheduler 108 will allow only 200 I/Os per second and will queue the remaining 800. Now 1000 I/Os constitute 10.08% of 9920. In one embodiment, the algorithm would therefore assign a greater weight (0.108) to HDD capacity while calculating the new aggregate for the next tick: 0.8992×10000+0.108×2000=9208. The above example shows how capacity calculation at the level one scheduler 104 and queue depth control at the level two scheduler 108 works in tandem to evenly distribute the workload across storage subsystems.

Figure 3:
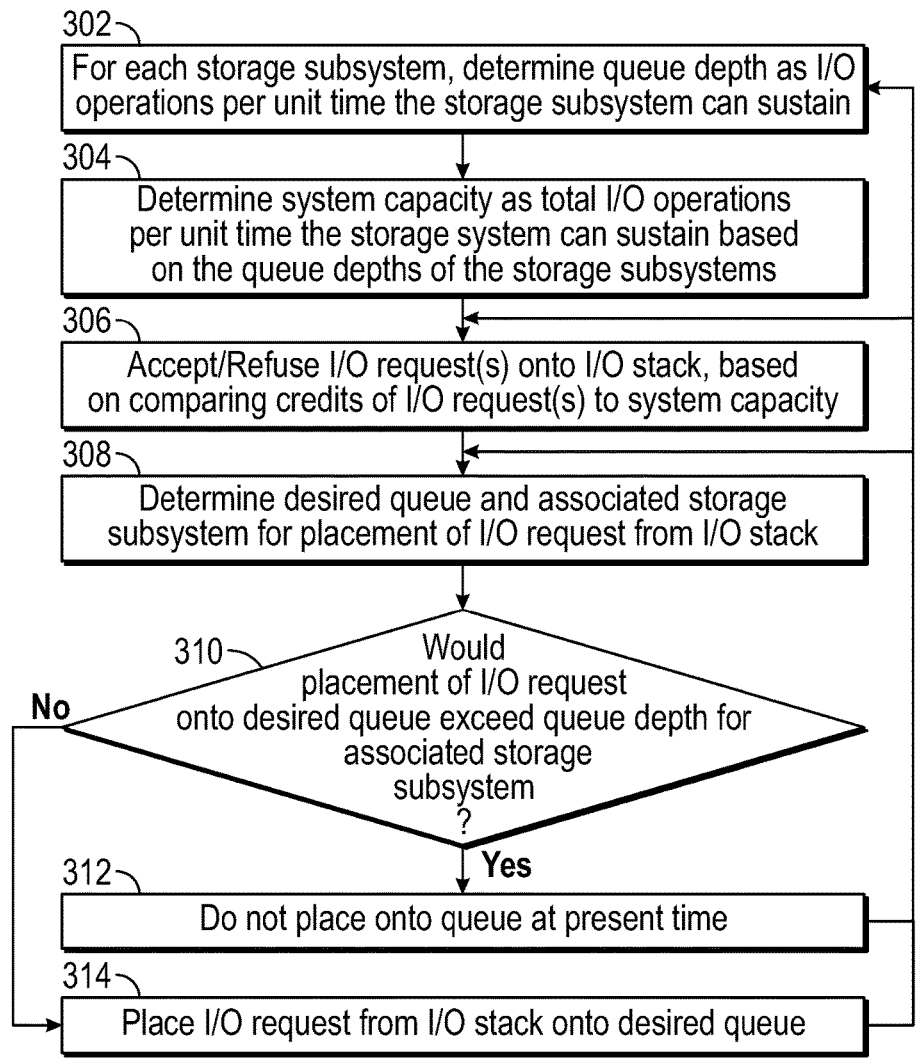
FIG. 3 is a flow diagram of a method for two level quality of service scheduling for latency and queue depth control in a storage system, which can be practiced on or by embodiments of the I/O scheduler and storage system of FIGS. 1A-2.

FIG. 3 is a flow diagram of a method for two level quality of service scheduling for latency and queue depth control in a storage system, which can be practiced on or by embodiments of the I/O scheduler and storage system of FIGS. 1A-2. The method can be practiced by a processor executing software, in a storage system or an I/O scheduler, and/or by a level one scheduler and a level two scheduler coupled to or in a storage system.

In an action 302, for each storage subsystem in a storage system, the queue depth is determined. The queue depth is determined as the number of I/O operations per unit time (e.g., per second or other unit of time) that the storage subsystem can sustain. Each storage subsystem is associated with a respective queue, which is coupled to the storage subsystem and has queue depth maintained by the level two scheduler as described above with reference to FIGS. 1A-2.

In an action 304, the system capacity is determined. The system capacity is the total number of I/O operations per unit time (e.g., per second or other unit of time) that the storage system can sustain. This is based on the queue depths of the storage subsystems, as determined in the action 302. The level one scheduler can calculate the system capacity based on results from the level two scheduler.

In an action 306, one or more I/O requests are accepted onto the I/O stack, or refused. The decision about whether to accept or refuse each I/O request is based on comparing the credits of that I/O request to the system capacity as determined in the action 304. The level one scheduler can perform the comparison and the decision.

In an action 308, an I/O request from the I/O stack is considered for placement onto a queue associated with a storage subsystem. The system, and more particularly the level two scheduler, determines which queue is the desired queue for placement of the I/O request from the I/O stack.

In a decision action 310, is determined whether placement of the I/O request onto the desired queue would exceed the queue depth for the associated storage subsystem. If the answer is yes, this would exceed the queue depth, then flow branches to the action 312, which is really an inaction, and instructs to not place the I/O request onto the queue at the present time. This may be seen as equivalent to taking an action to hold the I/O request or place the I/O request elsewhere. From the action 312, flow proceeds back to the action 308, to determine a different queue and associated storage subsystem for the I/O request if appropriate, or to consider another I/O request from the I/O stack, back to the action 306 in order to receive more I/O requests, or back to the action 302, to update the queue depths for the storage subsystems and update the system capacity.

If the answer to the decision action 310 is no, placing the I/O request onto the desired queue would not exceed the queue depth (as determined in the action 306) of that desired queue, flow proceeds to the action 314. In the action 314, the I/O request from the I/O stack is placed onto the desired queue. From the action 314, flow proceeds back to the action 308, to consider another I/O request from the I/O stack, back to the action 306 in order to receive more I/O requests, or back to the action 302, to update the queue depths for the storage subsystems and update the system capacity.

In various versions, flow could be driven by system events. For example a system clock tick of one per unit time (e.g., one per second) could drive the updating of the queue depths (at the action 302) and the system capacity (at the action 304), and arrival of an I/O request could drive the entry to the I/O stack (at the action 306). System routines could be implemented in parallel, with threads, or multiprocessors, etc.

It should be appreciated that the methods described herein may be performed with a digital processing system, such as a conventional, general-purpose computer system. Special purpose computers, which are designed or programmed to perform only one function may be used in the alternative.

Figure 4:
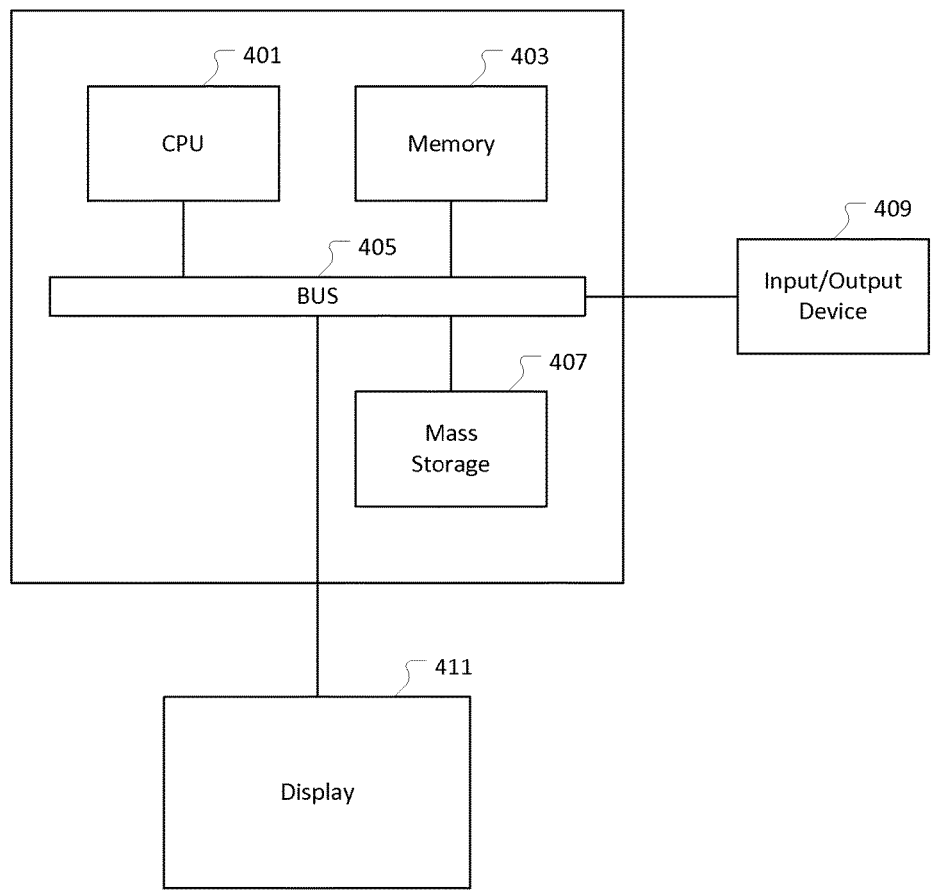
FIG. 4 is an illustration showing an exemplary computing device which may implement the embodiments described herein.

FIG. 4 is an illustration showing an exemplary computing device which may implement the embodiments described herein. The computing device of FIG. 4 may be used to perform embodiments of the functionality for two-level scheduling in accordance with some embodiments. The computing device includes a central processing unit (CPU) 401, which is coupled through a bus 405 to a memory 403, and mass storage device 407. Mass storage device 407 represents a persistent data storage device such as a floppy disc drive or a fixed disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1A-3. The code embodying this functionality may be stored within memory 403 or mass storage device 407 for execution by a processor such as CPU 401 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented by a physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A processor-based method for two level quality of service scheduling for latency and queue depth control in a storage system having a plurality of storage subsystems in which each storage subsystem has an associated queue and a level one scheduler provides a first level of scheduling input/output interactions with storage clients based on overall storage system capacity and a level two scheduler manages input/output flows with individual storage subsystems, comprising:
- determining, by the level two scheduler, a queue depth as input/output operations per unit time that a storage subsystem can sustain, for each of a plurality of queues corresponding to each storage subsystems in the storage system;
- determining, by the level one scheduler, a system capacity as total input and output operations per unit time that the storage system can sustain, based on the queue depth of each of the plurality of queues;
- determining, by the level one scheduler, whether to accept or deny an input/output request for placement onto an input/output stack, based on a comparison of credits of the input/output request to the system capacity as determined on an ongoing basis;
- placing, by the level two scheduler, the input/output request from the input/output stack onto one of the plurality of queues based on whether doing so maintains or exceeds the queue depth of the one of the plurality of queues;
- wherein the queue depth is controlled by, the level two scheduler, by the determining the queue depth and the placing; and
- wherein latency of input/output request servicing is controlled on the ongoing basis, by the determining for placement onto the input/output stack and the placing from the input/output stack with the level one scheduler regulating congestion of the input/output stack beyond the capacity of the storage system and the level two scheduler regulating oscillations in throughput.

2. The method of claim 1, further comprising:
distributing input/output requests from the input/output stack to the plurality of queues according to latency or throughput requirements of the input/output requests.

3. The method of claim 1, wherein the queue depth is associated with an underlying device or a storage tier of the storage system.

4. The method of claim 1, wherein the credits of the input/output request are based on at least one of: a service level agreement of an application associated with the input/output request, a deadline of the input/output request, or a throughput requirement of the input/output request.

5. The method of claim 1, wherein the queue depth is maintained by allowing, on the one of the plurality of queues, a total number of input/output requests less than or equal to the determined queue depth.

6. A tangible, non-transitory, computer-readable media having instructions thereupon which, when executed by a processor, cause the processor to perform a method for two level quality of service scheduling for latency and queue depth control in a storage system having a plurality of storage subsystems in which each storage subsystem has an associated queue and a level one scheduler provides a first level of scheduling input/output interactions with storage clients based on overall storage system capacity and a level two scheduler manages input/output flows with individual storage subsystems, the method comprising:
- determining by the level two scheduler, for each storage subsystem of a plurality of storage subsystems of a storage system how many input/output operations per unit time the storage subsystem can sustain, as a queue depth of the storage subsystem, wherein the queue depth is associated with a queue coupled to the storage subsystem, there being a plurality of such queues corresponding to the plurality of storage subsystems;
- determining, by the level one scheduler, based on the queue depths of the plurality of storage subsystems, total input/output operations per unit time that the storage system can sustain, as system capacity of the storage system;
- accepting or refusing, by the level two scheduler, to place input/output requests onto an input/output stack based on credits of each of the input/output requests in comparison to system capacity determined on an ongoing basis;
- moving, by the level two scheduler, the input/output requests from the input/output stack to the plurality of queues corresponding to the plurality of storage subsystems so as to maintain the queue depth of each such queue;
- controlling latency of input/output request servicing on the ongoing basis, by the accepting or refusing to place the input/output requests onto the input/output stack; and
- controlling the queue depth of each of the plurality of queues, by the determining the queue depth and each decision about when, and to which queue, to perform the moving of each of the input/output requests from the input/output stack to one of the plurality of queues;
- wherein the level one schedler regulates congestion of the input/output stack beyond the capacity of the storage system and the level two scheduler regulates oscillations in throughput.

7. The computer-readable media of claim 6, wherein the method further comprises:
determining to which of the plurality of queues to move each input/output request of the input/output requests from the input/output stack based on latency or throughput requirement of the input/output request.

8. The computer-readable media of claim 6, wherein the method further comprises:
- communicating with storage stack clients via an application programming interface; and
- communicating with device drivers of the plurality of storage subsystems via a further application programming interface.

9. The computer-readable media of claim 6, wherein the method further comprises:
placing, on each queue of the plurality of queues, from the input/output stack, a total number of input/output requests less than or equal to the queue depth of the queue.

10. A storage system scheduler, comprising:
an input/output stack;
a plurality of queues, each configured to couple to one of a plurality of storage subsystems of a storage system;
one or more processors, configured to implement a level one scheduler and a level two scheduler in which the level one scheduler provides a first level of scheduling input/output interactions with storage clients based on overall storage system capacity and the level two scheduler manages input/output flows with individual storage subsystems;
the level two scheduler configured to determine, on a continuous or interval basis, queue depth for each queue of the plurality of queues, wherein the queue depth is input/output operations per unit time the one of the plurality of storage subsystems to which the queue is coupled can sustain;
the level one scheduler configured to determine, on the continuous or interval basis, system capacity of the storage system, wherein the system capacity is the total input/output operations per unit time that the storage system can sustain, based on the queue depth of each of the plurality of queues;

the level one scheduler configured to compare credits of input/output requests to the system capacity as determined on the continuous or interval basis and accept or reject input/output requests onto the input/output stack based on such comparison;

the level two scheduler configured to move the input/output requests from the input/output stack onto the plurality of queues based on maintaining the queue depth of each of the plurality of queues;

the level two scheduler configured to control the queue depth of each of the plurality of queues on a continuous or interval basis;

wherein the level one scheduler regulates congestion of the input/output stack beyond the capacity of the storage system and the level two scheduler regulates oscillations in throughput.

11. The storage system scheduler of claim 10, further comprising:

the level two scheduler configured to distribute the input/output requests from the input/output stack to the plurality of queues based on latency or throughput requirements of the input/output requests.

12. The storage system scheduler of claim 10, further comprising:

the level one scheduler configured to provide an application programming interface by which storage stack clients communicate to the storage system scheduler; and the level two scheduler configured to provide an application programming interface by which device drivers managing the plurality of storage subsystems communicate to the storage system scheduler.

13. The storage system scheduler of claim 10, further comprising:

the one or more processors further configured to implement a storage discovery application programming interface by which storage characteristics of each storage subsystem discovered are communicated to the storage system scheduler.

14. The storage system scheduler of claim 10, further comprising:

the level two scheduler configured to determine whether placing one of the input/output requests from the input/output stack onto one of the plurality of queues exceeds the determined queue depth of the one of the plurality of queues and place the one of the input/output requests from the input/output stack onto the one of the plurality of queues responsive to a determination that this does not exceed the determined queue depth of the one of the plurality of queues.

* * * * *

UNITED STATES PATENT AND TRADEMARK OFFICE
CERTIFICATE OF CORRECTION

PATENT NO. : 10,255,217 B2
APPLICATION NO. : 14/945309
DATED : April 9, 2019
INVENTOR(S) : Niranjan Pendharkar and Prasanna Wakhare It is certified that error appears in the above-identified patent and that said Letters Patent is hereby corrected as shown below:

In the Claims

In Column 14, Line 25, please replace "schedler" with --scheduler--

Signed and Sealed this
Twenty-first Day of May, 2019

Andrei Iancu
*Director of the United States Patent and Trademark Office*